United States Patent [19]

Daidone

[11] 4,115,479

[45] Sep. 19, 1978

[54] CASTING RESINS BY POLYMERIZING LIQUID MONOMER IN MIXTURE OF PARTICULATED VINYL HALIDE RESINS

[75] Inventor: Philip Daidone, Matawan, N.J.

[73] Assignee: Vynacron Dental Co., Matawan, N.J.

[21] Appl. No.: 713,364

[22] Filed: Aug. 11, 1976

[51] Int. Cl.$^2$ ............................................. C08L 27/06
[52] U.S. Cl. ........................................ 260/884; 32/15; 260/876 R; 260/899; 260/901
[58] Field of Search .................... 260/884, 899, 876 R

[56] References Cited

U.S. PATENT DOCUMENTS

| | | | |
|---|---|---|---|
| 2,600,122 | 6/1952 | Meyer et al. | 260/884 |
| 3,418,274 | 12/1968 | Caplan et al. | 260/884 |
| 3,700,616 | 10/1972 | Zawadzki | 260/899 |
| 3,705,137 | 12/1972 | Kuwahara et al | 260/899 |
| 3,766,106 | 10/1973 | Yurimoto et al. | 260/899 |
| 4,014,956 | 3/1977 | Smith et al. | 260/899 |

*Primary Examiner*—Harold D. Anderson

[57] ABSTRACT

A casting resin wherein the finished casting has a combined vinyl resin content of from 20 to 65% prepared by polymerizing monomer, for instance methyl methacrylate in the presence of A) vinyl resin, for instance, polyvinylchloride or polyvinylchloride-polyvinylidene chloride copolymer having a particle size within the range of 0.2 to 5 $\mu$ and B) vinyl resin, for instance polyvinylchloride or polyvinylchloride-polyvinylidene chloride copolymer having a particle size within the range of 15 to 150 $\mu$, wherein said monomer is a non-solvent at room temperature for said vinyl resins.

11 Claims, No Drawings

CASTING RESINS BY POLYMERIZING LIQUID MONOMER IN MIXTURE OF PARTICULATED VINYL HALIDE RESINS

This invention relates to casting resins and more particularly casting resins having a vinyl resin content of from 20 to 65%, suitable for use as dental resins and to a process for the preparation of such casting resins. Dispersions of finely-divided vinyl chloride resins suspended in liquid plasticizers have been introduced under the term plastisols. These dispersions are fluid at ordinary temperatures, but on heating and subsequent cooling, they are converted to solid, elastomeric compositions due to solvation of the dispersed resin particles by the plasticizer. Heretofore, only very flexible elastomers have been made from plastisols because the amount of plasticizer required to yield a fluid dispersion or paste with the finely-divided vinyl chloride resin is so high that when the resin is ultimately elasticized with the plasticizer, the resulting elastomer is quite flexible and soft.

In U.S. Pat. No. 2,618,621, there is described a method for preparing modified plastisols which are fluid at ordinary temperatures but which will set up after a heating and cooling cycle to moderately rigid to semi-rigid elastomers. This is accomplished by replacing part of the usual plasticizer employed in plastisols with a methacrylate diester of a liquid polyethylene glycol. In the liquid state, this ester serves as part of the dispersant for the suspended particles of the vinyl chloride resin, but on heating it polymerizes. On cooling the gelled mass, the polymeric ester forms part of the colloidal composition but it is less effective as a plasticizer than the usual non-polymeric ester plasticizers. Consequently, the elastomer is stiffer.

Thus, it is known that plastic compositions may be formed by mixing a high molecular weight polymer with a vulcanizable plasticizer which is capable of polymerizing on heating and then heating the mixture to form a mass of reduced thermoplasticity.

One of the objects of this invention is to prepare modified plastisols which are fluid at room temperature and which will set up in the presence of a polymerization catalyst but where heating is not required.

Another object of the invention is to provide a method for preparing casting resins having a combined vinyl resin content of from 20 to 65%.

Still another object of the invention is to provide a method for the room temperature polymerization of a monomer, such as a methacrylate in the presence of high contents of finely divided vinyl resin.

Yet another object of the invention is to provide a fluid polymerization system which can be readily introduced into a mold and polymerized in situ to form a hard resin mass of uniform, non-porous, non-swelling nature.

A further object of the invention is to provide an improved dispersion system during polymerization to produce a resin having enhanced uniformity and processability.

Still a further object of the invention is to provide a polymerization system constituting a very fluid mass which can be readily introduced into a mold containing plastic or porcelain teeth so as to fill into all of the small and large cavities which are present in the mold and substantially and completely surround each individual tooth, undergoing polymerization in situ to form a hard plastic which ultimately forms the pink portion of a denture.

These and other objects and advantages of the invention will appear more fully from the following description of the invention.

The present invention broadly comprises a casting resin wherein the finished casting has a combined vinyl resin content of from 20 to 65% prepared by polymerizing monomer, for instance methyl methacrylate in the presence of (A) vinyl resin, for instance polyvinylchloride or polyvinylchloride-polyvinylidene chloride copolymer having a particle size within the range of 0.2 to 5 $\mu$ and (B) vinyl resin, for instance polyvinylchloride or polyvinylchloride-polyvinylidene chloride copolymer having a particle size within the range of 15 to 150 $\mu$, wherein said monomer is a non-solvent at room temperature for said vinyl resins.

This invention differs from the previous practice as for instance set out in U.S. Pat. No. 2,618,621, in that it has now been found that in addition to the first two requirements set forth therein and namely that:

1. The polymerizable plasticizer must be compatible with vinyl chloride resins and their conventional ester plasticizers both as a monomer and as a polymer.
2. It must not solvate the vinyl chloride resin at ordinary temperatures; otherwise the plastisols tend to gel and be too viscous, the polymerizable plasticizer must
3. Be capable of curing rapidly in the presence of the usual peroxide catalysts at room temperature to provide a hard resin with a flexural strength adapting the resin to use as an engineering plastic and more particularly to use as a denture resin.

The amounts of vinyl chloride resins employed in the formulation of the casting compositions of the invention are relatively high amounting to from 20 to 65%. In order that the plastisols will be fluid for application purposes, it is necessary that the sum of the two types of vinyl resins not exceed about 65% by weight of the entire composition. The two types of vinyl resin i.e., (A) vinyl resin for instance polyvinylchloride or polyvinylchloride-polyvinylidene chloride copolymer having a particle size within the range of 0.2 to 5 $\mu$ and (B) vinyl resin, for instance polyvinylchloride or polyvinylchloride-polyvinylidene chloride copolymer having a particle size within the range of 15 to 150 $\mu$, are present in a ratio of (A):(B) of 1-5:5-1.

The monomer for instance, methacrylate mono and/or diester constitutes from 35-80% by weight of the entire composition.

There is a limit to the amount of vinyl resin (A & B) which can be present in the composition and this is due to the fact that in general most vinyl resins have a very high absorption rate for the methacrylate monomer and therefore the maintenance of a suitably low viscosity for a time sufficient to effect satisfactory casting is not possible. Too high a viscosity gives rise to flow problems and therewith undesirable porosity, incomplete mold filling and the like.

In order that the compositions will be fluid for application purposes, it is necessary that the sum of the two types of vinyl resin constitute 20 to 65% by weight of the total of resin and both types of vinylresin, the vinyl chloride resin concentration being correspondingly 20 to 65% of the total.

The monomer, i.e., monomethacrylic acid and dimethacrylic acid ester as noted above constitute from 35–80% by weight of the entire composition. As the resultant stiffness and hardness increase with increasing concentration of the dimethacrylate, the amount thereof, i.e. its concentration in the solvent component has to be selected so that the cured resin product will have the desired hardness and flexural modulus of elasticity.

The resin formulations may be made by the same methods now practiced, i.e. by stirring specially prepared vinyl chloride resins in the monomer or by grinding the resins and the monomer on a three-roll mill.

In order to facilitate curing of the monomer, it is preferable to incorporate from 0.5 to 5% by weight of the monomer of a peroxide polymerization catalyst such as benzoyl peroxide, acetyl peroxide, t-butyl perbenzoate, lauroyl peroxide, and the like. In order to inhibit premature polymerization of the monomer in the plastisol, a polymerization inhibitor, such as hydroquinone, may be added.

The vinyl chloride resins employed in the making of the dispersions may be copolymers of vinyl chloride with other polymerizable materials, such as vinyl acetate, vinyl propionate, methyl acrylate, butyl acrylate, methyl methacrylate, butyl methacrylate, acrylonitrile, vinylidine chloride and maleate esters such as dibutyl maleate or the vinyl chloride resins may be delta or gamma polyvinyl chloride. To secure compositions of good physical properties, it is desirable that the vinyl chloride resins be of high molecular weights, as determined by their relative insolubility in certain solvents, such as toluene and butyl acetate. Most of the resins, however, are soluble in cyclic and unsaturated ketones, such as mesityl oxide, isophorone and cyclohexanone. In making the copolymers, vinyl chloride is usually employed in predominant amount. The preferred resins are copolymers of vinyl chloride and vinyl acetate containing 95 to 99% vinyl chloride, and polyvinyl chloride.

To obtain dispersions of adequate fluidity, it is essential to start with finely-divided resins. Mechanical methods of sub-division are, in general, not wholly satisfactory because of the limitation on the particle size of the resins obtainable. It is preferable to employ a vinyl chloride resin which is made by the polymerization of the monomeric materials in aqueous emulsion, according to known procedures, for instance, by polymerization at low temperatures of 35° to 40° C.

As has already been emphasized, it is critical to the invention that the resin is comprised of two components basically distinguished by particle size and namely that there is provided a component (A) having a particle size within the range of 0.2 to 5 $\mu$ and a component (B) having a particle size of from 15 to 150 $\mu$.

The monomer component is selected from the group of methyl methacrylate, ethyl methacrylate, butyl methacrylate, i-butyl methacrylate, i-propyl methacrylate, the corresponding acrylates, hydroxyacrylates and hydroxymethacrylates and their mixtures; diethylene glycol dimethacrylate, triethylene glycol dimethacrylate and tetraethylene glycol dimethacrylate and their mixtures.

In forming the dispersion, the vinyl chloride resins are intimately mixed with the monomer in the proportions smaller sized vinyl resin component to larger sized vinyl resin component of 1–5:5–1 and this mixed with the monomer solvent so that the vinyl resin constitutes 20–65% of the composition. There are added to the vinyl resin prior to addition of the monomer solvent, any pigments, stabilizers, powdered filling materials and flameproofing ingredients desired. Conventional plasticizers for the vinyl chloride resins which may be present include di(2-ethylhexyl) phthalate, dicapryl phthalate, tri(2-ethylhexyl) phosphate, butyl phthalyl butyl glycollate, dibutyl and dioctyl sebacate, di(2-ethylhexyl) succinate, tricresyl phosphate, the diester-amide of diethanolamine with 2-ethylhexanoic acid and the like.

The vinyl resin portion of the formulation can comprise 100% vinyl resin or it can include one or more acrylic resins. The amount of acrylic resin present will depend to a considerable extent on the amount of vinyl resin present in the specific formulation. If the vinyl resin content is low, for instance amounting to about 25%, then it is preferable that a resin component be selected which is 100% vinyl as this will ensure that the vinyl content in the final formulation is as high as possible. If the vinyl resin content which is present is in the area of 50%, then it may be advantageous to incorporate a small amount of an acrylic resin. If used, the acrylic resin should have a particle size in the coarse range and namely should exceed a size of 15 $\mu$. Such a resin can be methylmethacrylate resin or cross-linked methyl methacrylate resin for instance with a dimethacrylate.

The general procedure for making the formulation has been noted above and consists, in general, in admixing the fine and coarse vinyl resin components and then dispersing the mixture in the monomer under rapid agitation. It is, however, possible to introduce the coarse vinyl resin component into the monomer having dispersed therein the fine resin component.

The resin formulation is poured into the mold wherein polymerization takes place under ambient temperature. Preferably the mold is transferred into a pressure cooker so that the polymerization can be carried out under slightly elevated pressures of up to 100 psig. In some instances the mold with the formulation therein is placed into a centrifuge in order to facilitate and ensure that no cavities or vacancies remain.

In order to more fully illustrate the invention, the following examples are suggested by way of illustration, parts and percentages being by weight unless otherwise specifically noted.

In carrying out the examples the different liquid components A were prepared by dispersing the fine vinyl resin in dimethylacrylate and methyl methacrylate monomer having incorporated therein 0.5 parts by weight of a tertiary aromatic amine promoter.

Component B was then prepared by admixing the coarse vinyl resin, coarse acrylic polymer (where present) and peroxide catalyst as set out in the table I which follows.

Thereafter component A and component B were admixed in the formulations shown in Table 2 to effect polymerization of the monomer. In all instances a casting was obtained, the properties of which was to a considerable extent dependent on the nature and characteristics of the mixture and characteristics thereof at the time of admixing. This to a considerable extent being dependent on the percentage of monomer in the formulation.

| Component A (parts by weight) | A | B | C | D | E | F | G | H | I |
|---|---|---|---|---|---|---|---|---|---|
| Vinyl resin (fine) (Geon 121 - B. F. Goodrich) | 50 | 50 | 35 | 35 | 35 | 35 | 20 | 20 | 20 |
| Dimethacrylate monomer | 25 | 25 | 25 | 25 | 25 | 25 | 25 | 25 | 25 |
| Methyl methacrylate monomer | 25 | 25 | 40 | 40 | 40 | 40 | 55 | 55 | 55 |
| Promoter (0.5) (tertiary amine) | 100 | 100 | 100 | 100 | 100 | 100 | 100 | 100 | 100 |
| Component B (parts by weight) | A' | B' | C' | D' | E' | F' | G' | H' | I' |
| Acrylic Polymer (coarse) (methyl methacrylate) | 0 | 20 | 65 | 50 | 25 | 0 | 50 | 25 | 0 |
| Vinyl resin (coarse) (geon 202 B. F. Goodrich) | 100 | 80 | 35 | 50 | 75 | 100 | 50 | 75 | 100 |
| Peroxide (0.5) (benzoyl peroxide) | 100 | 100 | 100 | 100 | 100 | 100 | 100 | 100 | 100 |

| Parts by Weight | FORMULATIONS PVC Weight | % PVC | % Monomers |
|---|---|---|---|
| 10 A | 5 | 66.6 | 33.3 |
| 5 A' | 5 | | |
| 10 A | 5 | | |
| 10 A | 45.5 | | |
| 1 A' | 1 | | |
| 10 B | 5 | 60.0 | 33.3 |
| 5 B' | 4 | | |
| 10 B | 5 | 58.6 | 35.7 |
| 4 B' | 3.2 | | |
| 10 B | 5 | 55.7 | 38.4 |
| 3 B' | 2.4 | | |
| 10 B | 5 | 55 | 41.6 |
| 2 B' | 1.6 | | |
| 10 B | 5 | 52.6 | 45.5 |
| 1 B' | 0.8 | | |
| 10 C | 3.5 | 35.0 | 34.2 |
| 9 C' | 3.15 | | |
| 10 C | 3.5 | 35.0 | 40.6 |
| 6 C' | 2.1 | | |
| 10 C | 3.5 | 35.0 | 46.4 |
| 4 C' | 1.4 | | |
| 10 C | 3.5 | 35.0 | 54.2 |
| 2 C' | 0.70 | | |
| 10 D | 3.5 | 42.1 | 34.2 |
| 9 D' | 4.5 | | |
| 10 D | 3.5 | 46.8 | 40.6 |
| 6 D' | 3.0 | | |
| 10 D | 3.5 | 39.0 | 46.4 |
| 4 D' | 2.0 | | |
| 10 D | 3.5 | 37.5 | 54.2 |
| 2 D' | 1.0 | | |
| 10 E | 3.5 | 49.1 | 34.1 |
| 9 E' | 5.83 | | |
| 10 E | 3.5 | 46.1 | 40.6 |
| 6 E' | 3.88 | | |
| 10 E | 3.5 | 46.4 | 46.5 |
| 4 E' | 3.0 | | |
| 10 E | 3.5 | 41.6 | 54.1 |
| 2 E' | 1.5 | | |
| 10 F | 3.5 | 67.0 | 34.1 |
| 9 F' | 9.0 | | |
| 10 F | 3.5 | 59.2 | 40.6 |
| 6 F' | 6.0 | | |
| 10 F | 3.5 | 53.6 | 46.5 |
| 4 F' | 4.0 | | |
| 10 F | 3.5 | 45.7 | 54.2 |
| 2 F' | 2.0 | | |
| 10 G | 2.0 | 48.2 | 41.01 |
| 9 G' | 7.15 | | |
| 10 G | 2.0 | 42.3 | 50 |
| 6 G' | 4.76 | | |
| 10 G | 2.0 | 28.5 | 57.1 |
| 4 G' | 2.0 | | |
| 10 G | 2.0 | 25.0 | 66.0 |
| 2 G' | 1.0 | | |
| 10 H | 2.0 | 46.2 | 41.8 |
| 9 H' | 6.75 | | |
| 10 H | 2.0 | 40.6 | 49.7 |
| 6 H' | 4.5 | | |
| 10 H | 2.0 | 35.6 | 56.7 |
| 4 H' | 3.0 | | |
| 10 H | 2.0 | 29.1 | 66.2 |
| 2 H' | 1.5 | | |
| 10 I | 2.0 | 57.75 | 42.10 |
| 9 I' | 9.0 | | |
| 10 I | 2.0 | 50.0 | 50.0 |
| 6 I' | 6.0 | | |
| 10 I | 2.0 | 42.75 | 57.75 |
| 4 I' | 4.0 | | |
| 10 I | 2.0 | 33.3 | 66.7 |
| 2 I' | 2.0 | | |

What is claimed is:

1. A casting resin wherein the finished casting has a combined vinyl resin content of from 20 to 65% prepared by polymerizing a liquid monomer selected from the group consisting of methyl methacrylate, ethyl methacrylate, butylmethacrylate, i-butyl methacrylate, i-propyl methacrylate, the corresponding acrylates, hydroxyacrylates and hydroxy methacrylates and their mixtures; diethylene glycol dimethacrylate, triethylene glycol dimethacrylate and tetraethylene glycol dimethacrylate and their mixtures in the presence of (A) vinyl halide resin having a particle size within the range of 0.2 to 5 $\mu$ and (B) vinyl halide resin having a particle size within the range of 15 to 150 $\mu$ wherein said liquid monomer is a non-solvent at room temperature for said vinyl halide resins A and B and wherein said vinyl halide resins A and B are present in a ratio of A:B of 1-5:5-1.

2. A casting resin according to claim 1 wherein resin component B has a particle size wherein the majority of particles fall within the range of 15 to 30 $\mu$.

3. A casting resin according to claim 1 wherein said polymerization is carried out in the presence of a peroxide catalyst.

4. A casting resin according to claim 1 wherein said polymerization is carried out in the presence of a tertiary aromatic amine as promoter.

5. A casting resin according to claim 1, wherein said vinyl resin is vinyl chloride homopolymer or vinyl chloride copolymer with vinyl acetate, vinyl propionate, methyl acrylate, butyl acrylate, methyl methacrylate, butyl methacrylate, acrylonitrile, vinylidine chloride, or dibutyl maleate.

6. A casting resin according to claim 1 wherein said vinyl halide resin is vinyl chloride-vinylidine chloride copolymer.

7. A casting resin according to claim 1 wherein said vinyl halide resin component B additionally contains an acrylic resin.

8. A casting resin according to claim 7 wherein said acrylic resin is present in an amount of up to 65% referred to said component B.

9. Method of making the casting resin according to claim 1, which comprises polymerizing said liquid monomer in the presence of (A) vinyl halide resin having a particle size within the range of 0.2 to 5 $\mu$ and (B) vinyl halide resin having a particle size within the range of 15 to 150 $\mu$ wherein said monomer is a non-solvent at room temperature for said vinyl resins, wherein said vinyl halide resin components A and B are present in a ratio of A:B of 1–5:5–1 for a sufficiently long period of time to allow said polymerized liquid monomer and vinyl halide resins to be cast, wherein said monomer is present in an amount of 35 to 80% by wt of the entire mixture.

10. Method according to claim 1, which comprises conducting said polymerizing in the presence of a tertiary aromatic amine as promoter.

11. Method according to claim 9, which comprises conducting said polymerizing in the presence of a peroxide catalyst.

* * * * *